May 25, 1954 — R. McINTYRE — 2,679,110
SAW FILING GUIDE
Filed Sept. 17, 1952
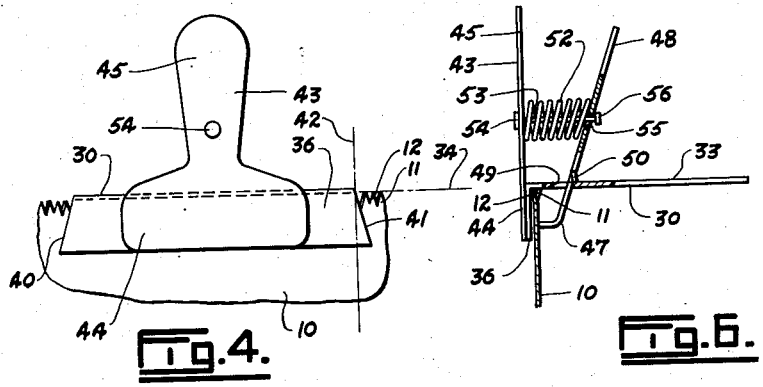
INVENTOR
RALPH McINTYRE
BY
Fetherstonhaugh & Co.
ATTORNEYS Patented May 25, 1954

2,679,110

UNITED STATES PATENT OFFICE 2,679,110

SAW FILING GUIDE

Ralph McIntyre, Nanaimo, British Columbia, Canada

Application September 17, 1952, Serial No. 309,979

6 Claims. (Cl. 33—202)

This invention relates to a guide to be used for filing or sharpening saws.

An object of the present invention is the provision of a guide which may be used for filing cross-cut saws or rip-saws.

Another object is the provision of a filing guide which may be adjusted for cross-cut saws and rip-saws.

The saw filing guide includes a guide plate and clamping means for securing the plate to a saw blade at the teeth thereof parallel with the plane of the teeth tips. It is desirable to position the guide plate so that it rests on the tips of the teeth and extends outwardly from the saw blade substantially at right angles thereto. At least one edge of this plate is positioned relative to the saw teeth at the correct angle to act as a guide for a file to be used against the transverse cutting edges of the teeth. As these cutting edges are bevelled transversely of the saw blade in a cross-cut saw, the edge of the guide plate extends outwardly from the blade at an acute angle for saws of this type. On the other hand, the guide edge of the plate extends outwardly from the blade at right angles thereto for rip-saws since the transverse cutting edges of the teeth thereof extend straight across the blade. While a separate tool may be made for the two different types of saws, it is preferable to provide two plates for the tool, each designed for one type of saw.

In addition to the above, the tool is provided with a flange extending transversely of the guide plate adjacent the saw blade end thereof. At least one end of the flange is positioned by the clamping means to act as a guide for a file to be used against the longitudinal cutting edges of the teeth. For cross-cut saws, the guide end of the flange extends downwardly at an angle to a plane lying at right angles to the plane of the guide plate, and for rip-saws, said end extends downwardly substantially at right angles to the plane of the guide plate.

Examples of this invention are illustrated in the accompanying drawings, in which, Figure 1 is an enlarged side elevation of the teeth of a cross-cut saw, Figure 2 is a section taken on the line 2—2 of Figure 1, Figure 3 is a section taken on the line 3—3 of Figure 1, Figure 4 is an elevation of a filing guide mounted on a cross-cut saw, Figure 5 is a plan view of the guide, Figure 6 is an end elevation, partly in section, of the guide, Figure 7 is an elevation of a filing guide mounted on a rip-saw, Figure 8 is a plan view of the guide of Figure 7, and Figure 9 is an end elevation, partly in section, of the guide of Figure 7.

Referring to Figures 1 to 3, 10 is a cross-cut saw blade having along one edge thereof teeth 11 and 12 alternately arranged and set on opposite sides of the plane of the blade. Each tooth 11 has longitudinally cutting edges 15 and 16 extending outwardly from the edge of the blade to a point 17. Each tooth is also bevelled at 19 and 20 to form surfaces or cutting edges extending transversely of the saw blade. Each tooth 12 is constructed in the same manner, and has longitudinal cutting edges 22 and 23, an outer point 24 and bevelled transverse cutting edges 26 and 27.

Figures 4 to 6 show a filing guide 30 mounted on the cross-cut saw blade 10. This filing guide includes a guide plate 33 adapted to be secured to the blade at the teeth thereof parallel with the plane 34 of the teeth tips and extending outwardly from the blade substantially at right angles thereto. A flange 36 extends tranversely of the plate adjacent the saw blade end thereof. This plate is preferably formed with or secured to the guide plate and depends therefrom, as clearly shown in Figure 6.

At least one edge of plate 30 is shaped to form a guide for a file to be used against the transverse cutting edges of the teeth 11 and 12. It is preferable to make both edges of the plate guides as shown in the drawings. In this example, the edges 38 and 39 of the guide plate converge outwardly from the flange end thereof. When the device is positioned on a saw blade, the guide edges of the plate extend outwardly from the blade at an acute angle thereto, see Figure 5.

At least one end of flange 36 is shaped to act as a guide for a file to be used against the longitudinal cutting edges of the teeth. It is, however, preferable to form both ends of the flange in this manner. In this example, the ends 40 and 41 of the flange extend downwardly at an angle to a plane 42 lying at right angles to the plane of the guide plate 33, said latter plane being parallel with the plane 34 of the tips of the saw teeth when the device is positioned on a saw blade.

Suitable clamping means is provided for securing the guide plate in position on a saw blade. In this example, a clamp 43 is provided for this purpose. The clamp includes a stationary jaw 44 secured to the flange 36 along the outer surface thereof, see Figures 4 and 6. This jaw has a handle 45 extending upwardly therefrom. Another jaw 47 having a handle 48 extending upwardly therefrom is hingedly mounted relative to jaw 44 in any desired manner. One way of doing this is to extend the handle 48 upwardly through a hole 49 formed in the plate 33. Lugs 50 extending outwardly and downwardly from the sides of handle 48 rest on the upper surface of the guide plate adjacent the hole 49. A spring 52 extends between handles 45 and 48 to keep the latter apart and to press jaw 47 towards jaw 44 and the flange 36. This spring may be mounted on a pin 53 which is secured at its end 54 to handle 45, and at its opposite end it extends freely through an opening 55 in handle 48, said pin being formed with a head 56 at this end.

When it is desired to place the filing guide on a saw blade 10, handles 45 and 48 of clamp 43 are pressed together to spread the clamping jaws 44 and 47. In the construction shown, the flange 36 actually forms part of jaw 44. The spring 52 presses the handle 48 against the edge of the guide plate 33 at the hole 49 therein so that the handle may pivot about said edge. The device is now placed on the saw blade with the inner end of the guide plate resting on the tips of teeth 11 and 12. The handles 45 and 48 are now released so that the jaws close against the blade to clamp the device in position. When it is desired to move the filing guide along the saw blade, the clamp is loosened by squeezing the handles 45 and 48 towards each other.

Figure 5 shows the filing guide 30 arranged on the saw blade in order that the teeth 12 thereof may be filed. All the transverse edges 26 are sharpened by running a file over the surfaces thereof parallel with the guide edge 38 of plate 33, while all the transverse edges 27 are sharpened by running a file over them parallel with the guide edge 39 of the plate. While this is being done, the file is also maintained at an angle parallel to the guide ends 40 and 41 of flange 36 in order to produce the right angle for the longitudinal cutting edges 22 and 23, respectively. The guide is easily shifted along the blade in order to position the guide edges and ends correctly relative to the cutting edges of the teeth during the filing operation. When it is desired to sharpen the teeth 11, it is only necessary to reverse the position of the filing guide on the saw blade and to file the transverse edges 19 and 20 while keeping the file parallel with the guide edges 38, 39, 40 and 41 of the device.

Figures 7 to 9 illustrate a form of the invention which may be used for filing rip-saws. This form of the invention includes a guide plate 60 having a flange 61 depending from one end thereof. This plate is similar to and larger than guide plate 33, and is adapted to fit under the latter. Plate 60 has a large opening 63 therein through which the jaw 47 of the clamp 43 may extend.

After the plate 60 is fitted in position beneath plate 33, as clearly shown in Figure 9, the device may be applied to the blade 65 of a cross-cut saw having teeth 66 along an edge thereof. Clamp 43 holds the filing guide in position in the manner described above. The guide edges 68 and 69 of plate 60 extend outwardly from the saw blade at right angles thereto, and the guide ends 70 and 71 of flange 61 extend downwardly substantially at right angles to the plane of the guide plate, see Figure 7.

Each tooth 66 of the rip-saw blade 65 has a transverse cutting edge 73 extending at right angles to the plane of the blade. This edge also forms a longitudinal cutting edge 74 which extends straight out from the edge of the saw blade. The opposite edge or back 75 of each tooth slopes from the tip 76 of the tooth back to the saw blade.

When the filing guide is clamped in position on the blade 65 with the guide plate 60 resting on the tips of the teeth 66 thereof, a file may be run over the cutting edge 73—74 of each tooth while being maintained parallel with the guide edges 68 and 60 or 69 and 71 of the plate 60 and flange 61, respectively. The clamp 43 not only holds the filing guide on the saw blade, but it retains guide plate 60 and its flange in the correct position to act as filing guides.

In the illustrated forms of the invention, plate 33 is fixed to clamp 43, and plate 60 is removably connected thereto. It is obvious that these plates may be reversed. In addition to this, plate 60 may be made into a separate tool by providing it with clamping means of its own.

What is claimed is:

1. A saw filing guide comprising a guide plate, clamping means for securing the plate to a saw blade at the teeth thereof parallel with the plane of the teeth tips and extending outwardly from the blade substantially at right angles thereto, one side edge of the plate being positioned by the clamping means relative to the saw teeth at the correct angle to act as a guide for a file to be used against the transverse cutting edges of the teeth, and a flange extending transversely of the plate adjacent the saw blade end thereof, said clamping means comprising a jaw secured to said flange, another jaw mounted to pivot inwards towards the other jaw, and spring means normally urging said jaws together, one end of the flange being positioned by the clamping means to act as a guide for a file to be used against the longitudinal cutting edges of the teeth.

2. A saw filing guide comprising a guide plate, clamping means for securing the plate to a saw blade resting on the tops of the teeth thereof and extending outwardly from the blade substantially at right angles thereto, one side edge of the plate being positioned by the clamping means relative to the saw teeth at the correct angle to act as a guide for a file to be used against the transverse cutting edges of the teeth, and a flange depending from the plate extending transversely thereof adjacent the saw blade end thereof, said clamping means comprising a jaw secured to said flange, another jaw mounted to pivot inwards towards the other jaw, and spring means normally urging said jaws together, one end of the flange being positioned by the clamping means to act as a guide for a file to be used against the longitudinal cutting edges of the teeth.

3. A saw filing guide as claimed in claim 2 in which the guide end of the flange extends downwardly at an angle to a plane lying at right angles to the plane of the guide plate.

4. A saw filing guide as claimed in claim 2 in which the guide end of the flange extends downwardly substantially at right angles to the plane of the guide plate.

5. A saw filing guide comprising a guide plate, a flange depending from the plate extending transversely adjacent one end thereof, a side of the plate and the adjacent end of the flange being adapted to act as a guide for a file to be used against the cutting edges of saw teeth, a jaw secured to the flange and having a handle extending upwardly therefrom, another jaw hingedly mounted opposite the first jaw and having a handle projecting upwardly therefrom, and spring means normally urging the jaws towards each other.

6. A saw filing guide comprising a guide plate, a flange depending from the plate extending transversely adjacent one end thereof, a side of the plate and the adjacent end of the flange being adapted to act as a guide for a file to be used against the cutting edges of saw teeth, a jaw secured to the flange and having a handle extending upwardly therefrom, another jaw hingedly mounted opposite the first jaw and having a handle projecting upwardly through a hole in the plate, and spring means between the handles normally urging the jaws towards each other.

References Cited in the file of this patent

UNITED STATES PATENTS

| Number | Name | Date |
|---|---|---|
| 1,243,731 | Gosline | Oct. 23, 1917 |
| 1,676,188 | Hugus | July 3, 1928 |
| 1,708,843 | McClintock | Apr. 9, 1929 |
| 1,753,701 | Grant | Apr. 8, 1930 |
| 1,833,251 | Hancock | Nov. 24, 1931 |